US012689593B1

(12) United States Patent
Ying et al.

(10) Patent No.: US 12,689,593 B1
(45) Date of Patent: Jul. 21, 2026

(54) METHOD AND APPARATUS FOR PACKET REORDERING AND AGGREGATION

(71) Applicant: Cadence Design Systems, Inc., San Jose, CA (US)

(72) Inventors: Liyan Ying, Los Altos Hills, CA (US); Marleson Graf, Brusque (BR); Kunal Chhabriya, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 122 days.

(21) Appl. No.: 18/322,497

(22) Filed: May 23, 2023

(51) Int. Cl.
  *H04L 47/41* (2022.01)
  *H04L 9/40* (2022.01)
  *H04L 47/62* (2022.01)

(52) U.S. Cl.
  CPC ............ *H04L 47/41* (2013.01); *H04L 47/624* (2013.01); *H04L 63/0428* (2013.01)

(58) Field of Classification Search
  CPC .... H04L 47/41; H04L 47/624; H04L 63/0428
  See application file for complete search history.

(56) References Cited

U.S. PATENT DOCUMENTS

| | | | | |
|---|---|---|---|---|
| 7,702,827 | B2 * | 4/2010 | Biran .................. | G06F 13/4282 |
| | | | | 710/316 |
| 2011/0225417 | A1 * | 9/2011 | Maharajh .............. | H04L 65/752 |
| | | | | 713/150 |
| 2016/0261517 | A1 * | 9/2016 | Kohiga ............... | H04L 47/6275 |
| 2017/0099231 | A1 * | 4/2017 | Li ....................... | H04L 43/0852 |
| 2018/0101498 | A1 * | 4/2018 | Cosby ................. | G06F 13/4282 |
| 2019/0173810 | A1 * | 6/2019 | Shpiner ............... | H04L 47/6225 |
| 2020/0052892 | A1 * | 2/2020 | Chhabra .............. | H04L 9/0631 |
| 2020/0151362 | A1 * | 5/2020 | Harriman ............. | G06F 21/85 |
| 2021/0400537 | A1 * | 12/2021 | Zhang ................... | H04L 47/30 |
| 2022/0300442 | A1 * | 9/2022 | Jeon ...................... | G06F 13/28 |
| 2022/0358075 | A1 * | 11/2022 | Wan .................... | G06F 13/4221 |
| 2023/0388251 | A1 * | 11/2023 | Schubert ................ | H04L 47/30 |
| 2023/0403260 | A1 * | 12/2023 | Hausauer ............ | H04L 63/0272 |
| 2023/0421545 | A1 * | 12/2023 | Shanbhogue ....... | H04L 63/0457 |
| 2024/0088922 | A1 * | 3/2024 | Jang ..................... | H03F 1/0277 |

* cited by examiner

*Primary Examiner* — Umar Cheema
*Assistant Examiner* — Adam A Cooney
(74) *Attorney, Agent, or Firm* — Foley & Lardner LLP

(57) ABSTRACT

The present embodiments relate generally to data communications, and more particularly to methods and apparatuses for packet reordering and aggregation. One or more embodiments relate to a solution in which transaction layer reordering is made aware of IDE aggregation requirements. For example, PCIe packets are reordered to minimize the occurrence of blocked packets due to incomplete aggregation for certain types of PCIe packets which still need to be encrypted. This leads to improved traffic variation and higher throughput, while still ensuring that IDE security requirements are upheld and maintained.

17 Claims, 8 Drawing Sheets

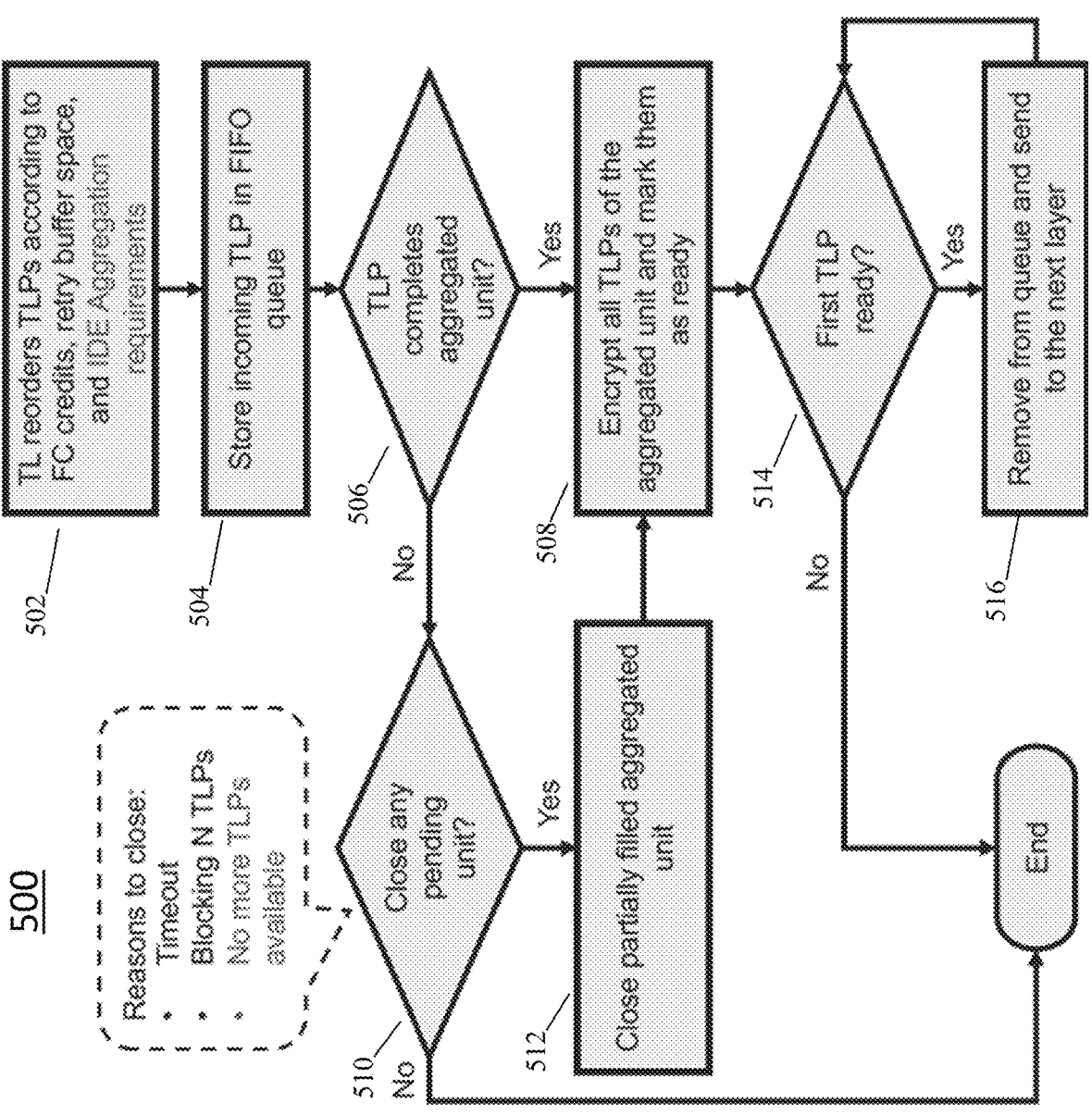

500

502 — TL reorders TLPs according to FC credits, retry buffer space, and IDE Aggregation requirements 504 — Store incoming TLP in FIFO queue 506 — TLP completes aggregated unit?

No

510 — Close any pending unit?

Reasons to close:
- Timeout
- Blocking N TLPs
- No more TLPs available

No

Yes → 512 — Close partially filled aggregated unit

Yes → 508 — Encrypt all TLPs of the aggregated unit and mark them as ready

514 — First TLP ready?

No → End

Yes → 516 — Remove from queue and send to the next layer

End

FIG. 6

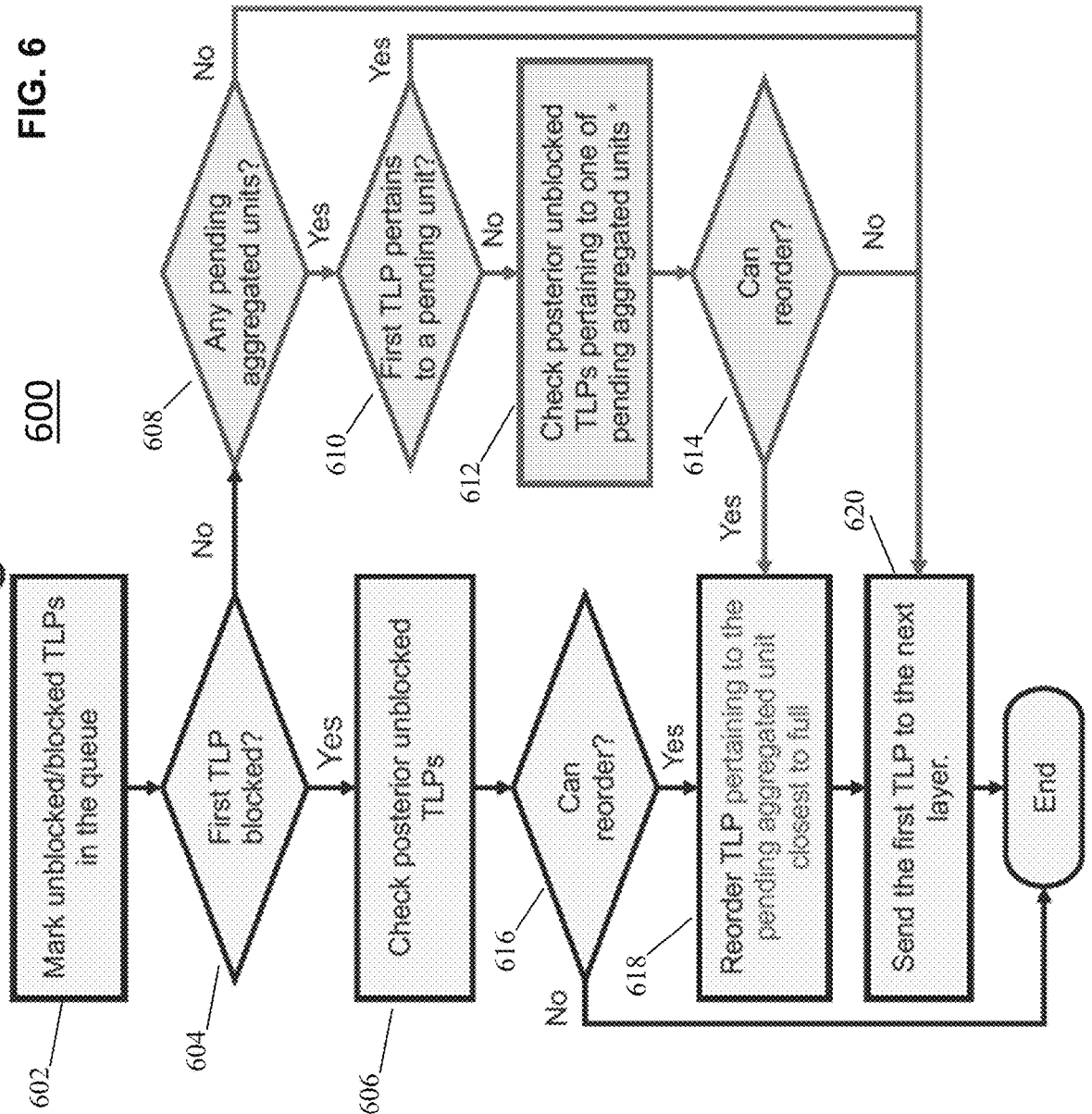

600

602 — Mark unblocked/blocked TLPs in the queue

604 — First TLP blocked?

606 — Check posterior unblocked TLPs

608 — Any pending aggregated units?

610 — First TLP pertains to a pending unit?

612 — Check posterior unblocked TLPs pertaining to one of pending aggregated units 614 — Can reorder?

616 — Can reorder?

618 — Reorder TLP pertaining to the pending aggregated unit closest to full

620 — Send the first TLP to the next layer.

End

METHOD AND APPARATUS FOR PACKET REORDERING AND AGGREGATION

TECHNICAL FIELD

The present embodiments relate generally to data communications, and more particularly to methods and apparatuses for packet reordering and aggregation to increase transportation throughput and variation.

BACKGROUND

Electronic communication is increasingly exposed to deployments and situations with strict demands on responsiveness, including in terms of both the speed of the communications, as well as the amount of information provided in the communications. In the event that electronic communication is not able to meet strict demands on responsiveness, the scope of use of electronic communication is reduced, and the reliability of electronic communication is not sufficient to effectively and efficiently address deployment in a significant number of desired deployments and situations.

Meanwhile, the new cloud, AI, Analytics, and Edge usage models with exponential data growth and connection drive the evolution of high-bandwidth Peripheral Component Interconnect Express (PCIe) version 5.0 and 6.0, Computer Express Link (CXL) version 2.0 and 3.0. Every component can be envisioned as an attack vector in modern computational systems, especially PCIe and CXL components, which are part of the system HW root-of-trust chain. Protecting key assets such as the data integrity and confidentiality of consumers, businesses, and governments is the cornerstones of PCIe/CXL technology and architecture.

It is against this technological backdrop that the present Applicant sought a technological solution to these and other problems rooted in this technology.

SUMMARY

The present embodiments relate generally to data communications, and more particularly to methods and apparatuses for packet reordering and aggregation. One or more embodiments relate to a solution in which transaction layer reordering is made aware of IDE aggregation requirements. For example, PCIe packets are reordered to minimize the occurrence of blocked packets due to incomplete aggregation for certain types of PCIe packets which still need to be encrypted. This leads to improved traffic variation and higher throughput, while still ensuring that IDE security requirements are upheld and maintained.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 5 is a flowchart illustrating an example aggregation methodology of embodiments.

FIG. 6 is a flowchart illustrating an example IDE aggregation-aware reordering methodology of embodiments.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments relate to methods and apparatuses for managing communications in a PCIe architecture, and more particularly to such architectures that support Integrity and Data Encryption (IDE). Among other things, the present Applicant recognizes that PCIe supports mechanisms such as aggregation and reordering that have various advantages. However, current aggregation and reordering mechanisms are oblivious to the requirements of IDE, such as requirements for performing encryption, and thus current solutions for integrating aggregation and reordering techniques with PCIe/IDE lead to various inefficiencies.

In embodiments, therefore, a solution is provided in which transaction layer reordering is made aware of IDE aggregation requirements. For example, PCIe packets are reordered to minimize the occurrence of blocked packets due to incomplete aggregation for certain types of PCIe packets which still need to be encrypted. This leads to improved traffic variation and higher throughput, while still ensuring that IDE security requirements are upheld and maintained.

Figure 1:
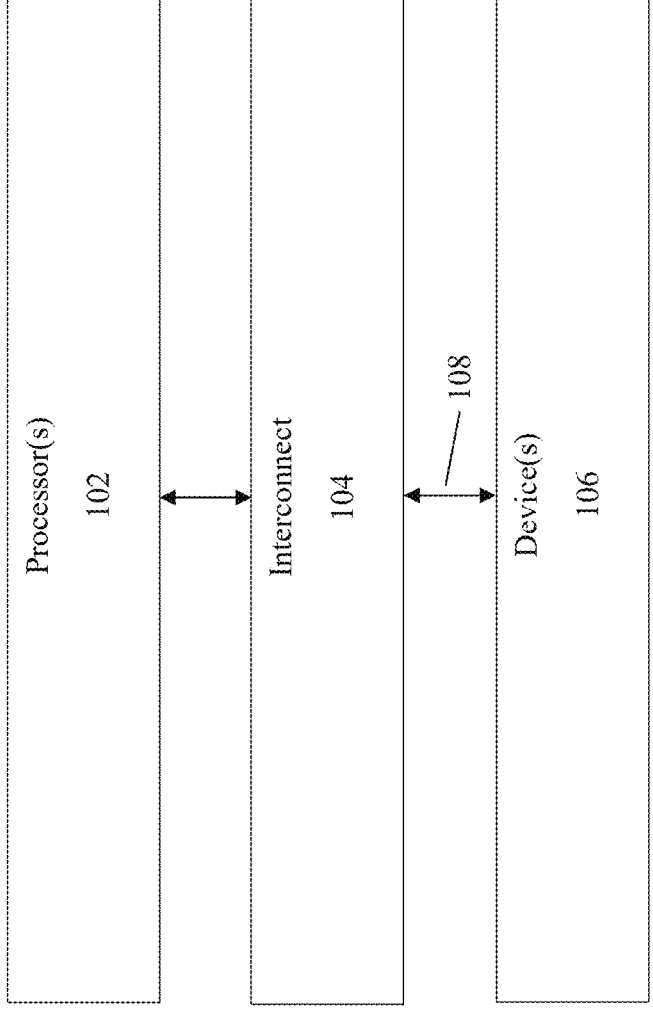
FIG. 1 is a block diagram of an example system in which the present embodiments may find useful application.

For assistance in illustrating aspects of the present embodiments, FIG. 1 is a block diagram of an example computing system or platform 100 in which embodiments may be practiced. As shown in FIG. 1, computing system or a platform 100 may use various device(s) 106 coupled to processor(s) 102 (e.g. one or more host CPUs and/or processor cores with associated memory, firmware, software etc.) via interconnect 104.

Interconnect 104 may include related hardware components (e.g., wire, optical fiber, etc.) and software, including communication protocols. A PCI bus or a PCI Express (PCIe, PCI-E) bus may implement interconnect 104 based on a specification that provides a mechanism for system software, or a system driver, to perform various operations related to the configuration of a device coupled to the PCI bus or the PCIe bus. Devices, or components 106 coupled to interconnect 104 may also be referred to as functions. Interconnect 104 may operate in consumer, server, and industrial applications, as a motherboard-level interconnect (to link motherboard-mounted peripherals), a passive back-plane interconnect, and as an expansion card interface for add-in boards. Device(s) 106 can communicate with interconnect 104 via a logical connection called an interconnect or link 108. Link 108 can be a point-to-point communication channel between two PCIe ports allowing both of them to send and receive ordinary PCI requests, e.g., configuration, input/output (I/O), or memory read/write, and interrupts. At the physical level, link 108 may be composed of one or more lanes. Low-speed peripherals, such as an 802.11 Wi-Fi card, use a single-lane (×1) link, while a graphics adapter typically uses a much wider and faster 16-lane link.

Computing system or platform 100 can comprise or be integrated into a physical device or a verification device. For example, a physical device can include one or more portions of a solid state electronic device, a portion of an integrated circuit, and a chipset including one or more integrated circuit devices, or any combination thereof. For example, the physical device can be integrated into a handset, mobile computer, smartphone, or the like.

A verification device can include a physical or virtual device, and can perform one or more testing operations during or in connection with operation of the computing system or platform 100. For example, the verification device can be implemented using a testbench and configured to monitor one or more aspects of operation of one or more designs of the physical device. In these and other embodiments, the design comprises code for one or more integrated circuit components written in a design language such as RTL, System Verilog, VHDL, etc. and/or written at higher or lower levels of abstraction (e.g., SystemC, C, or C++ models). In these and other embodiments, the design can include a complete design of one or more components for an entire integrated circuit (e.g. ASIC or SOC) or application. In other embodiments, the design can include a design for one or more sub-components for an integrated circuit (e.g. ASIC or SOC), such as a block or a unit. One or more portions of the design can include code from various sources such as RTL generated by a high level synthesis (HLS) tool, hand-written RTL, or acquired soft IP.

In these and other embodiments, device(s) 106 can include specialized accelerators (such as smart NIC devices) with no local memory, high-performance GDDR or HBM memories, memory expansion devices and persistent memory (e.g. devices which provide processor(s) 102 (e.g. a host CPU with low-latency access to local DRAM or byte-addressible non-volatile storage), devices that can implement Global Fabric Attached Memory (GFAM) mode, and devices that use a Port Based Routing (PBR) addressing mechanism.

Figure 2:
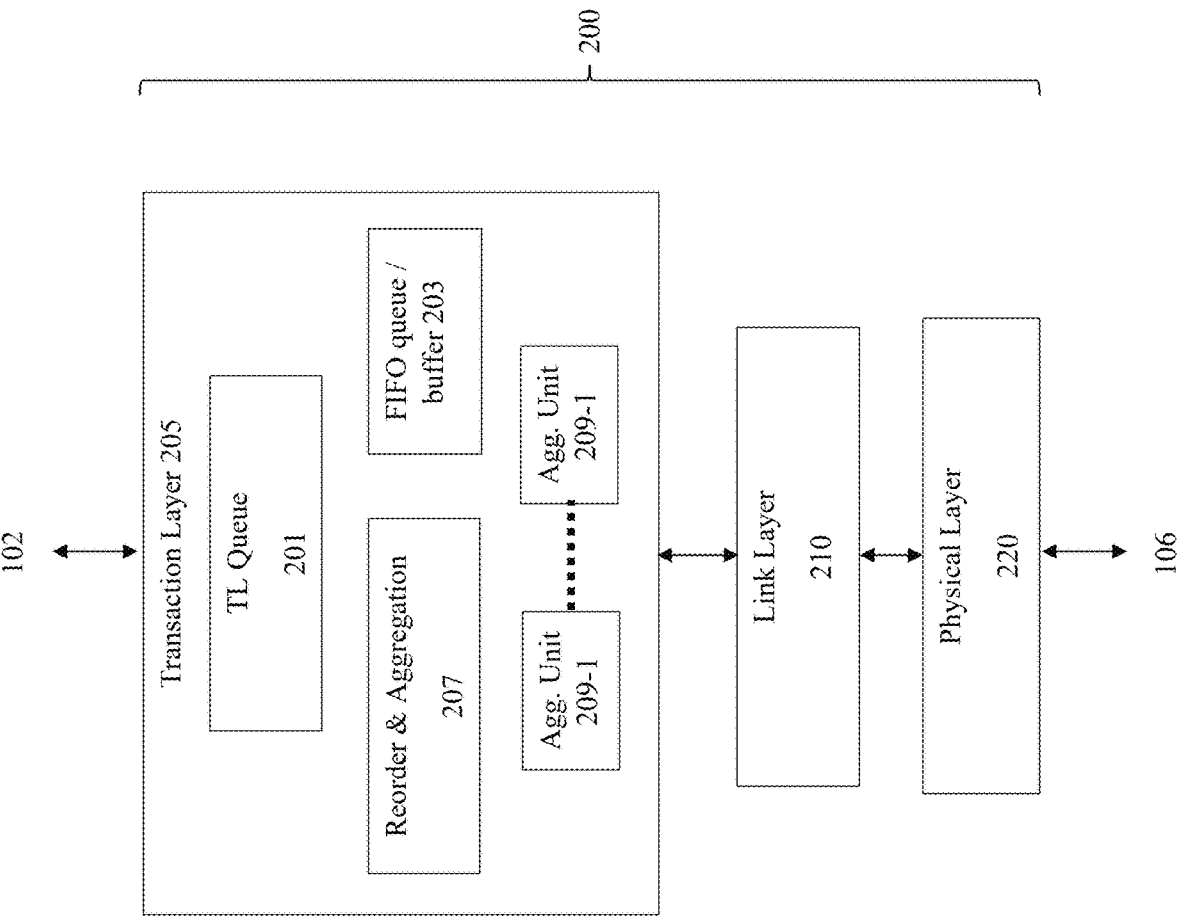
FIG. 2 is a block diagram illustrating an example implementation of an interface according to embodiments.

As illustrated by way of example in FIG. 2, interconnect 104 can be implemented by a stack 200 having a plurality of layers. Stack 200 may be implemented in one or more components of a computing device or platform 100, such as a PCI/IDE controller, an application processor or baseband processor or modem, among other examples Layered protocol stack 200 includes logic implemented in hardware circuitry and/or software to implement any form of a layered communication stack, such as a Quick Path Interconnect (QPI) stack, a PCIe stack, a next generation high performance computing interconnect stack, or other layered stack. Although the discussion immediately below is provided in relation to a PCIe stack, similar concepts may be applied to other interconnect stacks, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others.

In one embodiment, protocol stack 200 is a PCIe protocol stack including transaction layer 205, link layer 210 (also referred to herein as 'data link layer'), and physical layer 220. An interface, such as interconnect 104, may be represented as communication protocol stack 200. Representation as a communication protocol stack may also be referred to as a module or interface implementing/including a protocol stack.

PCIe uses packets to communicate information between components. Packets are formed in the transaction layer 205 and data link layer 210 to carry the information from the transmitting component to the receiving component. As the transmitted packets flow through the other layers, they are extended with additional information necessary to handle packets at those layers. At the receiving side the reverse process occurs, and packets get transformed from their physical layer 220 representation to the data link layer 210 representation and finally (for transaction layer packets) to the form that can be processed by the transaction layer 205 of the receiving device.

In one embodiment, transaction layer 205 provides an interface between a device's processing core (e.g. processor(s) 102) and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-based flow control for TLPs. PCIe implements split transactions, i.e. transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 205. An external device at the opposite end of the link, such as device(s) 106 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

With reference again to FIG. 2, link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components of a link. One side of the Data Link Layer 210 accepts TLPs assembled by the Transaction Layer 205, applies a packet sequence identifier, i.e. an identification number or packet number, calculates and applies an error detection code, i.e. CRC, and submits the modified TLPs to the Physical Layer 220 for transmission across a physical to an external device.

Physical layer 220 includes a transmitter and a receiver. The transmitter is supplied with symbols, which the transmitter serializes and transmits on to an external device(s) 106. The receiver is supplied with serialized symbols from an external device(s) 106 and transforms the received signals into a bit-stream. The bit-stream is de-serialized for supply to link layer 210.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, a port/ interface that is represented as a layered protocol includes: (1) a first layer to assemble packets (i.e., a transaction layer); a second layer to sequence packets (i.e., a link layer); and a third layer to transmit the packets (i.e., a physical layer). As a specific example, a common standard interface (CSI) layered protocol is utilized.

According to certain aspects mentioned above, the present Applicant recognizes that IDE provides security robustness against physical attacks and improves security link-to-link packets transmitted and received between two ports. It flexibly supports a variety of use models while providing broad interoperability. The cryptographic mechanisms are aligned to industry best practices and can be extended as security requirements evolve. As such, IDE provides confidentiality, integrity, and replay protection for TLPs for PCIe and FLIT (Flow Control Units) for CXL. IDE relies on AES-GCM for encryption of TLP Data Payload and authenticated integrity protection of entire TLP. Both PCIe and CXL support MAC aggregations to optimize the bandwidth utilized.

PCIe supports Link IDE Stream (which applies to all TLP traffic) and Selective IDE Stream (applying to TLPs selectively and can pass through Switches). Each IDE Stream includes Sub-Streams distinguished by TLP type and direction with Posted Requests, Non-Posted Requests, and Completions. CXL.io IDE follows PCIe IDE ECN. CXL.cache and CXL.mem IDE operate on FLIT granularity, all protocol FLITs are encrypted and integrity protected, supporting Containment mode and Skid mode. IDE is thus a preferred feature that can help make PCIe Links secure.

According to certain additional aspects, the present Applicant recognizes that IDE TLP aggregation is one way to minimize traffic overhead by performing the encryption over two or more TLPs bundled together. The overhead comes from the additional data sent together with the TLPs: the Message Authentication Code (MAC), which is 96 bits. With no aggregation, each TLP has its own MAC, i.e., each TLP has an additional overhead of 96 bits. With aggregation, TLPs are grouped together in an aggregated unit, and only one MAC is generated per unit. It is allowed to aggregate fewer TLPs than specified, forming partially filled aggregated units. Aggregated units can only contain TLPs of the same type: for example Non-Posted Requests (NPR), Posted Requests (PR) and Completions (CPL).

According to certain additional aspects, the present Applicant further recognizes that TLP reordering is a mechanism present in the Transaction Layer (TL) with the purpose of reordering TLPs when they get blocked by lack of buffer space, such as retry buffer space and Flow Control (FC) credits. The overall idea is to move unblocked TLPs in front of blocked TLPs, so throughput is maintained. FC credits are also separated by type: for example PR, NPR and CPL.

Returning to the example of FIG. 2, in accordance with these and other aspects, a transaction layer 205 of stack 200 according to embodiments includes a TL queue 201 (e.g. containing all TL packets received at layer 205) and reordering and aggregation block 207. Based on the TLPs in queue 201, block 207 manages a plurality of aggregation units 209-1 to 209-n (wherein n can be or correspond to a number of different types of TLPs such as NPR, PR, CPL, for example) and an internal IDE layer buffer 203. Example operations of block 207 with respect to the contents of aggregation units 209 and ID layer buffer (e.g. FIFO queue) 203 will be described in more detail below.

Figure 3:
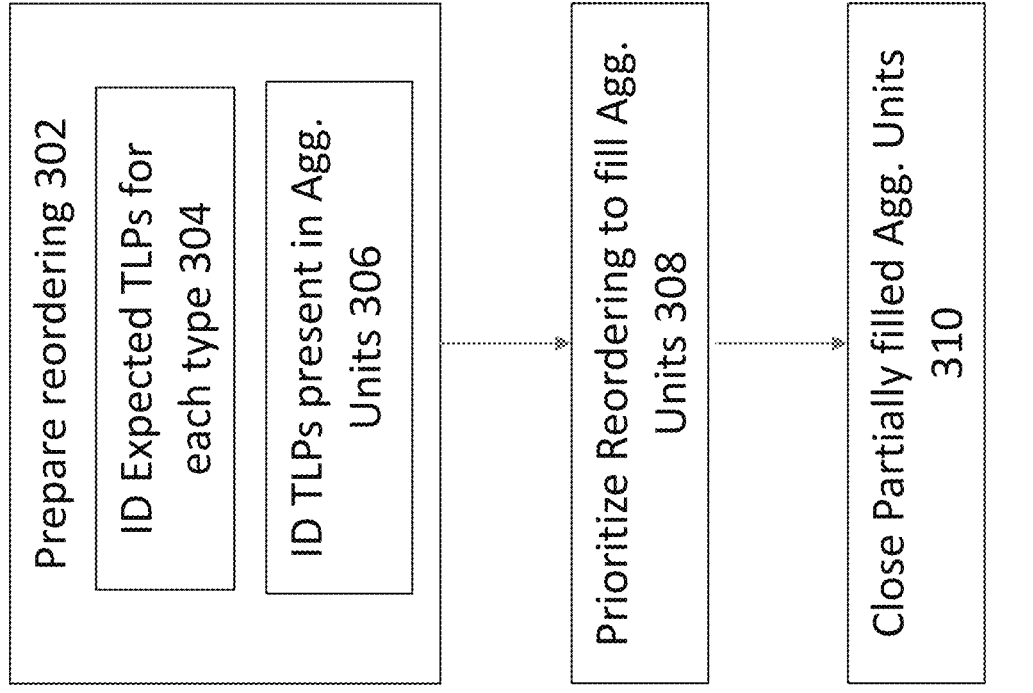
FIG. 3 is a flowchart illustrating an example methodology 300 according to embodiments.

FIG. 3 is a flowchart of an example methodology 300 according to embodiments. This example methodology 300 can be performed by a reordering and aggregation block 207 such as that shown in FIG. 2, for example. This example methodology includes operations 302, 304, 306, 308 and 310. However, other embodiments may include additional or fewer operations. Moreover, the sequence of operations shown in this example is not necessary in all embodiments.

In 302, to maximize aggregation potential, embodiments of block 207 can instrument TLP reordering at the transaction layer by identifying certain attributes. As shown in the example, operation 302 includes operation 304, where embodiments identify an expected number of aggregated TLPs for each type (e.g. PR, NPR, etc.), for example by inspecting the packets contained in TL queue 201. In this example, operation 302 also includes operation 306, where embodiments identify how many TLPs are already present in each pending aggregated unit 209.

In 308, with this information from operation 302, embodiments of block 207 prioritize reordering TLPs in queue 201 for processing and storing in the IDE Layer internal buffer (e.g. buffer 203) so as to fill up aggregated units (e.g. units 209) in an optimized manner, improving throughput (less blocked TLPs) and bandwidth utilization (less partially filled aggregated units).

In 310, partially filled aggregated units (e.g. units 209) can be closed, for example when it is detected that are no more TLPs available in the TL queue 201. This can be performed after a timeout, for example.

Figure 4A:
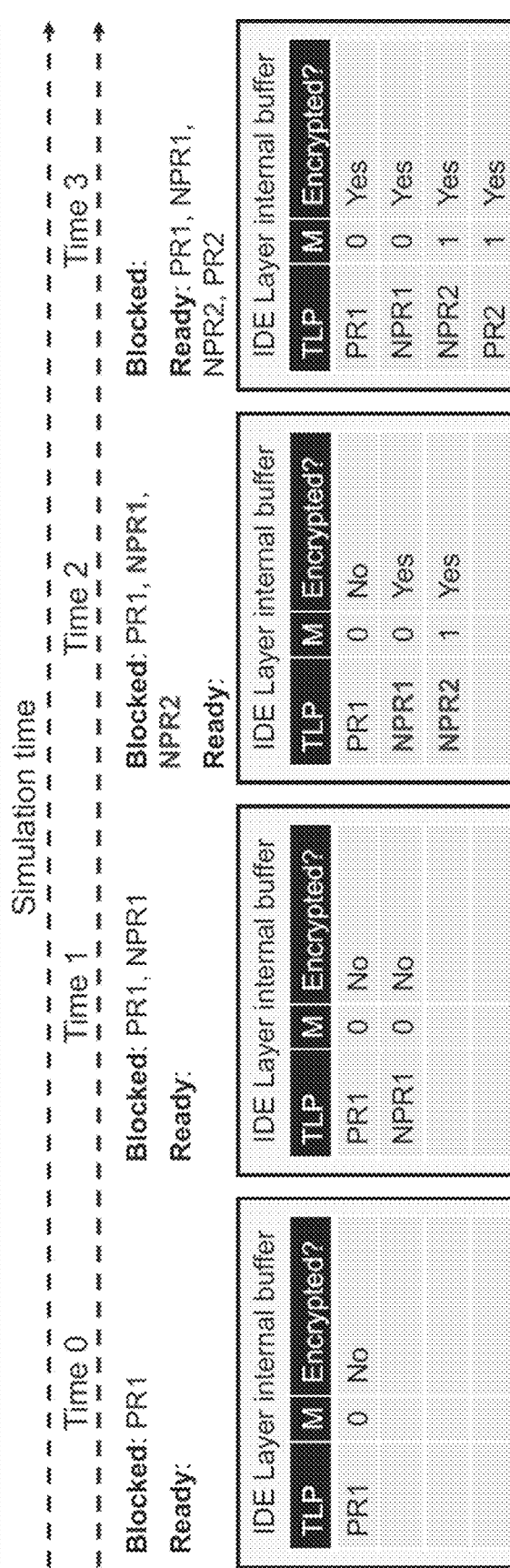
FIGS. 4A to 4C illustrate aspects of an example aggregation and/or reordering solution according to the present embodiments.

FIG. 4A illustrates aspects of one example solution using timeout only to perform aggregation. In this example, no TLP reordering targeting IDE aggregation is performed. Only timeout is used to close partially filled aggregated units. A general methodology of this solution is to: (1) Mark TLPs in the IDE layer buffer (e.g. buffer 203) as ready after encryption/decryption; (2) Close partially filled aggregated units (e.g. units 209) after timeout and (3) Move TLPs to the next layer in FIFO order, blocking all TLPs when the first one is not ready. It should be noted that in this example, the aggregation parameters provide that an aggregation unit is considered completely "filled" when two different packets of the same type are ready. However, this example is for illustration purposes only, and many other aggregation parameters are possible, including different numbers for different types of TLPs.

FIG. 4A further illustrates contents of an example IDE Layer internal buffer (e.g. buffer 203) at each of four different time stages corresponding to the reception of TL packets in connection with this solution. It should be noted that the intervals in the sequence shown in FIG. 4A do not necessarily correspond to an equal amount of time, but are merely shown for illustrating a sequential order over time. These amounts of time between the illustrated times in the sequence can correspond to the times between arrivals of packets, for example.

In Time 0, a first TL packet of type PR (e.g. PR1) has been received. PR1 is blocked in the IDE layer internal buffer and has not been encrypted.

In Time 1, a first TL packet of type NPR (e.g. NPR1) has been received. PR1 and NPR1 are both blocked in the IDE layer internal buffer and have not been encrypted because they cannot be aggregated.

In Time 2, a second TL packet of type NPR (e.g. NPR2) has been received. PR1 has not been encrypted, while NPR1 and NPR2 have been encrypted. Accordingly, NPR1 and NPR2 could be ready. However, PR1, NPR1 and NPR2 are all blocked in the IDE layer internal buffer because prior-received PR1 cannot be aggregated or encrypted.

In Time 3, a second TL packet of type PR (e.g. PR2) is received. Now PR1 and PR2 are marked as ready, and all TLPs can be marked as ready.

In this example, there can be more traffic variation, in that interleaved aggregated units can be generated. However, the overall throughput is low because TLPs can be blocked by other pending aggregated units that were received first. Partially filled aggregated units are only closed after timeout.

Figure 4B:
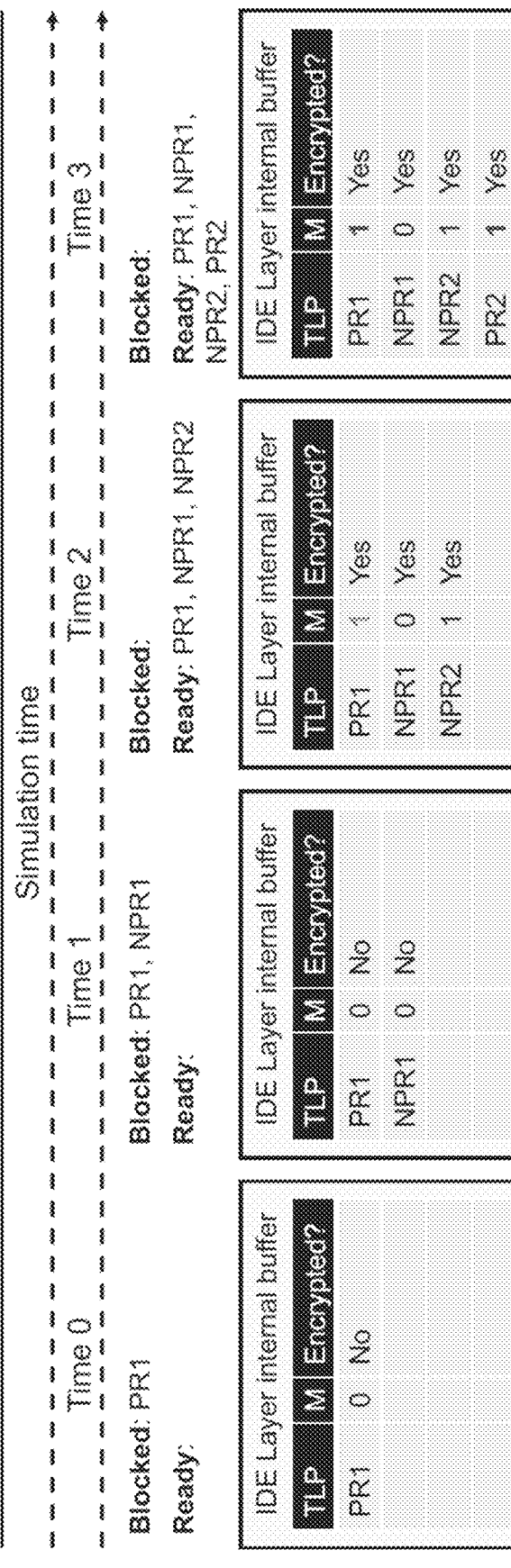

FIG. 4B illustrates aspects of another example solution, which involves closing partially filled aggregated units (e.g. units 209). In this example as in the previous example of FIG. 4A, no TLP reordering targeting IDE Aggregation is performed. Partially filled aggregated units which are blocking other types of TLPs are closed. In general, a methodology according to this example includes: (1) Mark TLPs in the IDE layer buffer as ready after encryption/decryption; (2) Close partially filled aggregated unit if blocking other types of TLPs or after timeout; and (3) Move TLPs to the next layer in FIFO order, blocking all TLPs when the first one is not ready. It should be noted that in this example, the aggregation parameters provide that an aggregation unit is considered completely "filled" when two different packets of the same type are ready. However, this example is for illustration purposes only, and many other aggregation parameters are possible, including different numbers for different types of TLPs.

FIG. 4B further illustrates contents of an example IDE Layer internal buffer (e.g. buffer 203) at each of four different time stages corresponding to the reception of TL packets in connection with this solution.

In Time 0, a first TL packet of type PR (e.g. PR1) has been received. PR1 is blocked in the IDE layer internal buffer and has not been encrypted.

In Time 1, a first TL packet of type NPR (e.g. NPR1) has been received. PR1 and NPR1 are both blocked in the IDE layer internal buffer and have not been encrypted because they cannot be aggregated.

In Time 2, a second TL packet of type NPR (e.g. NPR2) has been received. Accordingly, NPR1 and NPR2 are aggregated and ready. Because NPR1 and NPR2 are ready, PR1 is closed out as well, even though there is no aggregation, to avoid them from being blocked.

In Time 3, a second TL packet of type PR (e.g. PR2) is received. After a timeout, it is closed out also, even though this results in 2 partially filled PR aggregated units.

In this possible solution, there is less traffic variation than the example of FIG. 4A because interleaved aggregated units cannot be generated. And there is less throughput, given the additional overhead due to partially filled aggregated units. However, partially filled aggregated units are closed as soon as possible, which can be considered one improvement as compared to the example solution of FIG. 4A.

Figure 4C:
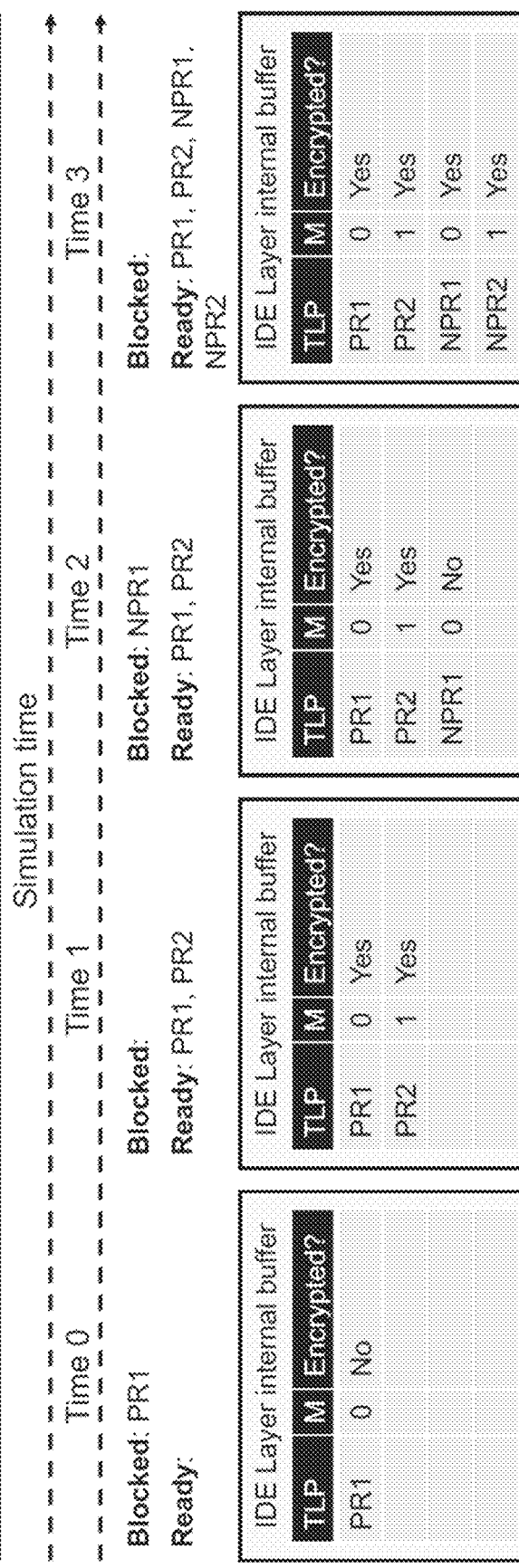

FIG. 4C illustrates aspects of a preferred example solution, which involves optimized IDE aggregation-aware reordering according to the present embodiments. In this example, optimized TLP reordering for IDE Aggregation is performed, which involves closing partially filled aggregated units (e.g. units 209) guided by the TL or due to timeout. In general, a methodology (e.g. performed by block 207) according to this example includes: (1) Optimize TLP order in the TL (e.g. queue 201); (2) Mark TLPs in the IDE layer buffer (e.g. buffer 203) as ready after encryption/decryption; (3) Close partially filled aggregated units (e.g. units 209) due to timeout, blocking a given number (N) of TLPs in buffer 203, or if no more TLPs of its type are available at the TL (e.g. queue 201); and (4) Move TLPs to the next layer in FIFO order, blocking all TLPs when the first one is not ready. It should be noted that in this example, the aggregation parameters provide that an aggregation unit is considered completely "filled" when two different packets of the same type are ready. However, this example is for illustration purposes only, and many other aggregation parameters are possible, including different numbers for different types of TLPs.

FIG. 4C further illustrates contents of an example IDE Layer internal buffer (e.g. buffer 203) at each of four different time stages. Differently from the previous examples, the time stages shown in the example of FIG. 4C include operations for packet reordering, and not necessarily bound to the reception of TL packets.

In Time 0, a first TL packet of type PR (e.g. PR1) has been processed by block 207. PR1 is blocked in the IDE layer internal buffer 203 and has not been encrypted.

In Time 1, after reordering of TL queue 201 has been performed by block 207 in accordance with the present embodiments, PR2 is moved to the buffer 203 ahead of NPR1. PR1 and PR2 are thus not blocked in the IDE layer internal buffer 203 and can be encrypted and aggregated.

In Time 2, NPR1 is now processed. NPR1 is blocked in the IDE layer internal buffer 203 and has not been encrypted.

In Time 3, a second TL packet of type NPR (e.g. NPR2) is received and processed. Accordingly, NPR1 and NPR2 are aggregated and ready.

According to certain aspects, in this solution in accordance with the present embodiments, TLP reordering is made aware of IDE Aggregation requirements. There is more traffic variation compared to the example of FIG. 4B because interleaved aggregated units can be generated. There is also more throughput as compared to both of the example solutions in FIG. 4A and FIG. 4B, given that TLPs are reordered to minimize the occurrence of blocked TLPs due to pending aggregated units. Also, partially filled aggregated units can be closed if no more TLPs of the same type are available in the TL.

FIG. 5 is a detailed flowchart of an example aggregation method 500 according to embodiments. This example methodology 500 can be performed by a reordering and aggregation block 207 such as that shown in FIG. 2, for example. This example methodology includes operations 502, 504, 506, 508, 510, 512, 514, 516 and 518. However, other embodiments may include additional or fewer operations. Moreover, the sequence of operations shown in this example is not necessary in all embodiments.

In some embodiments, some or all of the operations of methodology 500 are performed each time a new packet is received at the transaction layer and/or any time there are TLP packets in the TL queue (e.g. queue 201) that have not been processed for reordering. However, this is not necessary in all embodiments, and many variations are possible, such as based on an elapsed time, or different numbers of received TLP packets, etc. It should be noted that different degrees of reordering can be applied to generate interleaved aggregated units, such as reordering packets that are above a given position (N) in the TL queue (e.g. queue 201).

In any event, the example methodology 500 begins with operation 502. In operation 502, an IDE aware-reordering is performed that takes account of TLPs that are blocked due to lack of FC credits, retry buffer space, or to prioritize filling pending aggregated units. Further details of an example reordering methodology that can be performed in operation 502 are provided in connection with FIG. 6 below.

Returning to FIG. 5, in 504, after reordering of queue 201 is performed, the next TLP packet is added to the FIFO queue (e.g. IDE layer internal buffer 203).

In 506, it is determined whether the addition of the TLP to the FIFO queue (e.g. buffer 203) causes an aggregation unit of its type to be completed (e.g. a corresponding one of units 209). This determination can be made based on aggregation parameters, such as a threshold number for the given type of TLP packet, for example.

If it is determined in 506 that the new TLP results in a completion of an aggregation unit, then processing proceeds to operation 508. Otherwise, processing proceeds to operation 510.

In operation 510, it is determined whether any pending aggregation unit should be closed due to timeout, a given number (N) of TLPs of other types being blocked in the queue (e.g. buffer 203), or no more TLPs of its type are available in the TL queue (e.g. queue 201).

If it is determined in 510 that a partially filled aggregation unit (e.g. one of units 209) should be closed, then processing proceeds to operation 512. Otherwise, processing ends.

In operation 512, the partially filled aggregated unit identified in operation 510 is closed and processing proceeds to operation 508.

In operation 508, all TLPs of this aggregated unit 209 (either the partially filled aggregation unit identified in operation 510, or the completed aggregation unit identified in 506) are encrypted and marked as ready.

In operation 514, it is determined if the first TLP of the FIFO queue (e.g. buffer 203) is marked as ready. If so, processing proceeds to operation 516. Otherwise, processing ends.

In operation 516, the first TLP is removed from the queue and sent to the next layer and processing returns to operation 514. It should be apparent that this loop continues until all TLPs marked as ready are removed from the queue (e.g. buffer 203).

FIG. 6 is a detailed flowchart of an example reordering method 600 according to embodiments. This example methodology 600 can be performed by a reordering and aggregation block 207 such as that shown in FIG. 2, and in connection with an IDE aggregation-aware reordering step 502 shown in FIG. 5, for example. This example methodology includes operations 602, 604, 606, 608, 610, 612, 614, 616, 618 and 620. However, other embodiments may include additional or fewer operations. Moreover, the sequence of operations shown in this example is not necessary in all embodiments.

In 602, the example methodology loops through all TLPs in the TL queue (e.g. queue 201), marking each one as unblocked or blocked, which can depend on if it passes or fails the retry buffer space and FC credit requirements. For example, a TLP can be marked as unblocked if it passes the requirements, and marked as blocked if it does not.

In 604, it is determined whether the first TLP in the queue (e.g. queue 201) is blocked.

If it is determined in 604 that the first TLP in the queue (e.g. queue 201) is blocked, then processing continues to 606. Otherwise, processing continues to 608.

In 608, it is determined whether there are pending aggregation units in the related IDE Stream. If it is determined that there are pending aggregation units in the related IDE stream, processing continues to 610. Otherwise, processing continues to 620.

In 610, it is determined if the type of this TLP corresponds to one of the pending aggregated units.

If it is determined in 610 that the type of this TLP does not correspond to one of the pending aggregated units, the processing continues to 612. Otherwise processing continues to 620.

In 612, a check is performed to determine whether there are any posterior unblocked TLPs and have the same type of one of the pending aggregated units. This operation 612 can further include informing the IDE layer if there are no more TLPs for a pending aggregated unit.

In 614, it is determined if there are TLPs available for reordering. For example, this can include identifying whether operation 612 determined that there are one or more unblocked TLPs having a same type as one of the pending aggregation units.

If it is determined in 614 that there are TLPs available for reordering, processing continues to 618. Otherwise processing continues to 620.

Returning to the flow of operations discussed above, operation 606 is reached if it is determined in 604 that the first TLP in the queue is blocked.

In 606, a check is performed to determine which posterior unblocked TLPs can be reordered, i.e., moved to the front of the queue (e.g. queue 201), for example if they have the same type as one of the pending aggregation units.

In 616, it is determined if there are TLPs available for reordering. For example, this can include identifying whether operation 606 determined that there are one or more unblocked TLPs having a same type as one of the pending aggregation units.

If it is determined in 616 that there are TLPs available for reordering, processing continues to 618. Otherwise processing ends.

As discussed above, operation 618 is reached if it is determined in either operation 614 or operation 616 that there are TLPs available for reordering In 618, reordering is performed. In some embodiments, this includes (1) Choosing the TLP which has the type with the aggregated unit closest to full. (2) Reordering the chosen TLP to the front of the queue (e.g. queue 201).

After performing operation 618, operation 620 is performed. As discussed above, operation 620 is also reached after if is determined in operation 608 that there are no pending aggregation units or if the first TLP in queue 201 pertains to a pending aggregation unit.

In operation 620, the first TLP is sent to the next layer (e.g. provided for further processing by the aggregation methodology 500, as described above).

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for managing communications, comprising:
   maintaining received packets in a queue;
   aggregating packets from the queue in a plurality of aggregation units, wherein the aggregation units are configured for performing subsequent encryption of the aggregated packets;
   reordering the packets in the queue in accordance with a filled status of the plurality of aggregation units such that at least one of the packets corresponding to an aggregation unit closest to being full is moved to the head of the queue;
   determining when one of the aggregation units satisfies a parameter;
   encrypting the packets in the one aggregation unit when it is determined that the one aggregation unit satisfies the parameter;
   removing the packets in the one aggregation unit from a buffer when it is determined that the one aggregation unit satisfies the parameter; and
   sending the encrypted packets in the one aggregation unit to a next communications layer.

2. The method of claim 1, wherein the packets are transaction layer packets (TLPs) and the queue is a transaction layer (TL) queue.

3. The method of claim 1, wherein aggregating includes:
   determining a respective one of a plurality of packet types for each packet in the buffer, wherein each packet type corresponds to one of the aggregation units; and
   grouping together packets based on the determined packet types in the corresponding aggregation units.

4. The method of claim 3, wherein the packet types include Non-Posted Request (NPR), Posted Request (PR) and Completion (CPL).

5. The method of claim 1, wherein the parameter is a threshold number of packets.

6. The method of claim 1, wherein the parameter is a timeout.

7. An apparatus for managing communications, compris- ing:

a queue configured for storing packets;

a plurality of aggregation units, wherein the aggregation units are configured for performing subsequent encryption of packets contained therein; and a reordering and aggregation block configured to:

aggregate packets from the queue into the aggregation units;

reorder the packets in the queue in accordance with a filled status of the plurality of aggregation units such that at least one of the packets corresponding to an aggregation unit closest to being full is moved to the head of the queue;

determine when one of the aggregation units satisfies a parameter;

encrypt the packets in the one aggregation unit when it is determined that the one aggregation unit satisfies the parameter;

remove the packets in the one aggregation unit from a buffer when it is determined that the one aggregation unit satisfies the parameter; and send the encrypted packets in the one aggregation unit to a next communications layer.

8. The apparatus of claim 7, wherein the packets are transaction layer packets (TLPs) and the queue is a transaction layer (TL) queue.

9. The apparatus of claim 7, wherein aggregating includes:

determining a respective one of a plurality of packet types for each packet in the buffer, wherein each packet type corresponds to one of the aggregation units; and grouping together packets based on the determined packet types in the corresponding aggregation units.

10. The apparatus of claim 9, wherein the packet types include Non-Posted Request (NPR), Posted Request (PR) and Completion (CPL).

11. The apparatus of claim 7, wherein the parameter is a threshold number of packets.

12. The apparatus of claim 7, wherein the parameter is a timeout.

13. A computer readable program product comprising a nontransitory storage medium having instructions stored thereon, which when executed by a processor, cause the processor to perform method for managing communications, comprising:

maintaining received packets in a queue;

determining a respective one of a plurality of packet types for each packet in a buffer, wherein each packet type corresponds to one of a plurality of aggregation units, wherein the aggregation units are configured for performing subsequent encryption of the aggregated packets;

grouping together packets, from the queue, based on the determined packet types in the corresponding aggregation units;

reordering the packets in the queue in accordance with a filled status of the plurality of aggregation units such that at least one of the packets corresponding to an aggregation unit closest to being full is moved to the head of the queue;

determining when one of the aggregation units satisfies a parameter;

encrypting the packets in the one aggregation unit when it is determined that the one aggregation unit satisfies the parameter;

removing the packets in the one aggregation unit from the buffer when it is determined that the one aggregation unit satisfies the parameter; and sending the encrypted packets in the one aggregation unit to a next communications layer.

14. The computer readable program product of claim 13, wherein the packets are transaction layer packets (TLPs) and the queue is a transaction layer (TL) queue.

15. The computer readable program product of claim 13, wherein the parameter is a threshold number of packets.

16. The computer readable program product of claim 13, wherein the parameter is a timeout.

17. The method of claim 1, wherein the plurality of aggregation units respectively correspond to a plurality of packet types, and wherein reordering includes:

identifying a blocked packet in the queue;

determining if one of the plurality of aggregation units corresponding to the packet type of the blocked packet contains one or more other packets; and if it is determined that the one aggregation unit contains one or more other packets, reordering the blocked packet to the head of the queue.

* * * * *